United States Patent
Thurlow et al.

(10) Patent No.: US 6,457,879 B1
(45) Date of Patent: Oct. 1, 2002

(54) METHOD FOR CONTINOUOUSLY PROCESSING ELECTRONIC MESSAGES THROUGHOUT A TRANSITION BETWEEN ONLINE AND OFFLINE STATES

(75) Inventors: Scott A. Thurlow, Kirkland, WA (US); David A. Raissipour, Bellevue, WA (US); Stephen T. Wells, Seattle, WA (US); Robert M. Price, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/992,730

(22) Filed: Dec. 17, 1997

(51) Int. Cl.[7] ............................................. G06F 15/16
(52) U.S. Cl. .................. 395/200.36; 345/327; 710/104
(58) Field of Search ........................... 379/58; 709/232, 709/217, 226, 227, 201, 206; 345/352, 335, 327; 370/286; 340/5.6; 395/856, 425, 800, 601; 707/201; 710/17, 104, 129; 455/517; 702/202, 227, 229; 714/4; 717/11; 705/27; 348/15

(56) References Cited

U.S. PATENT DOCUMENTS

| | | | | |
|---|---|---|---|---|
| 4,851,988 A | * | 7/1989 | Trottier et al. ............... | 709/226 |
| 5,349,685 A | * | 9/1994 | Houlberg .................... | 395/800 |
| 5,414,817 A | * | 5/1995 | Ezzet et al. .................... | 710/17 |
| 5,475,378 A | * | 12/1995 | Kaarsoo et al. ............... | 340/5.6 |
| 5,479,472 A | * | 12/1995 | Campana Jr et al. ......... | 379/58 |
| 5,673,257 A | * | 9/1997 | Sharma et al. ............... | 370/286 |
| 5,710,922 A | * | 1/1998 | Alley et al. .................. | 707/201 |
| 5,758,088 A | * | 5/1998 | Bezaire et al. ............... | 709/332 |
| 5,802,304 A | * | 9/1998 | Stone .......................... | 709/227 |
| 5,809,242 A | * | 9/1998 | Shaw et al. .................. | 709/217 |
| 5,818,447 A | * | 10/1998 | Wolf et al. .................. | 345/335 |
| 5,867,162 A | * | 2/1999 | O'Leary et al. ............. | 345/352 |
| 5,892,909 A | * | 4/1999 | Grasso et al. ................ | 709/201 |
| 5,940,771 A | * | 8/1999 | Gollnick et al. ............. | 455/517 |
| 5,969,750 A | * | 10/1999 | Hsieh et al. .................... | 348/15 |
| 6,014,688 A | * | 1/2000 | Venkatraman et al. ....... | 709/206 |
| 6,054,982 A | * | 4/2000 | Kikuchi et al. .............. | 345/327 |
| 6,058,250 A | * | 5/2000 | Harwood et al. ........... | 709/227 |
| 6,064,982 A | * | 5/2000 | Puri ............................. | 705/27 |
| 6,096,096 A | * | 8/2000 | Murphy et al. ............... | 717/11 |
| 6,105,096 A | * | 8/2000 | Martinelli et al. .......... | 710/129 |
| 6,119,186 A | * | 9/2000 | Watts et al. ................. | 710/104 |
| 6,219,799 B1 | * | 4/2001 | Kandasamy .................. | 714/4 |

OTHER PUBLICATIONS

Beestermoller et al, An Online and Offline Proigrammable Multi–Loop Controller for Distributed Systems, IEEE 1994.*

* cited by examiner

Primary Examiner—Mark H. Rinehart
Assistant Examiner—Thong Vu
(74) Attorney, Agent, or Firm—Merchant & Gould, LLC

(57) ABSTRACT

An electronic mail (e-mail) application program includes a configurable, e-mail messaging feature for automatically responding to a portable computer's transition between online and offline states. The e-mail application program determines the state of a connection between a portable computer and an electronic mail server and processes electronic messages in accordance with the appropriate state. The portable computer's transition between an online state and an offline state triggers a user-configurable response, designed to permit the continuation of electronic mail message processing in a manner that accommodates the state change. The e-mail application program responds to such a change by automatically switching between online and offline modes of operation. The e-mail application program can also respond to such a transition by establishing a secondary connection to a mail server when a primary connection is rendered inoperative. A user may configure various aspects of the invention to respond to a transition in a way that accommodates the user's hardware and/or software requirements.

7 Claims, 6 Drawing Sheets

METHOD FOR CONTINOUOUSLY PROCESSING ELECTRONIC MESSAGES THROUGHOUT A TRANSITION BETWEEN ONLINE AND OFFLINE STATES

TECHNICAL FIELD

The present invention relates to a method for sending and receiving electronic messages, and more particularly relates to an improved method for enabling a computer to continually process electronic messages when the computer makes a transition between online and offline states.

BACKGROUND OF THE INVENTION

Electronic mail (e-mail) has become an extremely popular communications medium. Computer users have replaced many forms of paper correspondence with e-mail correspondence to capitalize on the speed and economy of electronic communication. The typical office or campus environment utilizes a Local Area Network (LAN) to connect computer users to a central e-mail system. Generally, a LAN connection provides a direct line of communication between an individual user's computer (remote computer) and the e-mail system (mail server). LAN connections are usually hard-wired into a building or across a campus so that all of the remote computers in the network can enjoy the benefits of a direct connection to the server. However, as portable computers have become more popular and powerful, users are demanding access to mail servers from locations where direct, hard-wired connections are not feasible.

Typically, a connection between the remote computer and the mail server can be either a direct connection, provided by a Local Area Network (LAN), or a dial-up connection, provided through a modem connection to a network node. At work a portable computer user might have a docking station that provides a LAN connection. When away from the office with the portable computer undocked, the user might utilize a modem to connect to the mail server. A computer network that supports modem connections is commonly referred to as a dial-up network, because it typically utilizes a telephone connection between the modem and the server.

Because a LAN connection is a direct, hard-wired connection, it can provide high-speed communications capabilities between the mail server and the remote computer. A remote computer user can connect to the mail server (go "online"), access his or her mail, send outgoing e-mail messages, check for and receive incoming e-mail messages, and remain online for extended periods. As mail is sent to the remote computer user, via the mail server, the mail server processes and delivers the mail to the remote computer user's e-mail server. The remote computer periodically polls the server to check the user's e-mail mailbox for new incoming e-mail messages.

A dial-up connection provides access to e-mail for remote computer users that are located in areas where LAN access to the mail server is unavailable (e.g., at home, at a hotel, etc.). Typically, a dial-up connection is utilized where the remote computer user wishes to use a modem to connect to the mail server via a telephone connection. Because the connection is not direct, communication between the mail server and the remote computer is slower than with a LAN connection. The remote computer user, connected via a dial-up connection, can perform all of the operations that could be performed via a LAN connection, but each operation usually takes more time.

The remote computer user will typically perform e-mail operations by utilizing an e-mail client application program module (e-mail client) that runs on the remote computer. The e-mail client may communicate with the mail server to send and receive e-mail messages in a format that is readable to both the remote computer and the mail server. The mail server also may have an e-mail application program module operating to communicate with the remote computer's e-mail client.

One option that many e-mail clients offer permits the remote computer user to operate in an offline mode. Offline mode is generally a means by which the user can compose e-mail messages and read previously received e-mail messages, regardless of whether the user's computer is actually connected to a mail server. Communication between the remote computer and the mail server is not attempted by an e-mail client in offline mode.

In this context, "online state" is used to indicate the existence of an operable line of communication between a mail server and a remote computer, regardless of whether the communication line is being utilized by an e-mail client. "Online mode" is used to indicate that an e-mail client running on a remote computer is operating in a manner that requires an operable line of communication between a mail server and the remote computer. That is, for the e-mail client to successfully operate in online mode, the remote computer on which the e-mail client is running must be in an online state.

Similarly, "offline state" indicates the absence of an operable line of communication between a mail server and a remote computer. "Offline mode" indicates that an e-mail client running on a remote computer is operating in a manner that does not require an online state. An offline mode of operation does not typically require that the remote computer be in an offline state. Unlike online mode, offline mode can be successfully implemented by an e-mail client without regard to the online/offline state of the remote computer.

The ability to process e-mail messages in offline mode is desirable to e-mail users. When a user wants to prepare e-mail messages for subsequent transmission, the user may do so without having to connect to the mail server. Where the user doesn't have access to an electronic connection to the server or the user's server has crashed, this capability permits the user to perform his or her composition work and then send the composed messages, as a batch, at a later time. This mode of operation permits the user to work more efficiently, by not limiting composition to only those times that the user is connected to a mail server.

Offering users the capability of operating in either online or offline mode has, unfortunately, spawned another problem. Most e-mail clients are not well equipped to accommodate a transition between online and offline modes of operation. Consequently, a computer's transition between online and offline states can disrupt effective e-mail message processing.

The typical use of a portable computer presents a representative illustration of a transition between online and offline states. A user might have a portable computer that is equipped to operate in conjunction with a docking station. Docking stations are well known to those skilled in the computer arts and typically provide a base station for a portable computer. A docking station often includes such devices as a power supply, expansion slots, a monitor, a keyboard connector, connectors for CD-ROM, floppy or hard drives, and a LAN connection. The LAN connection can provide a communication line between the portable computer and a mail server.

The portable computer might be docked in a docking station one minute and undocked the next minute. When a portable computer that is processing e-mail messages in online mode is undocked from its docking station, the connection between the computer and the mail server will be severed. Most e-mail clients do not provide a means for responding to this transition between online and offline states. The user will be unable to continue processing e-mail because the e-mail client will be attempting to operate as if the laptop were still connected to the mail server. In such a case, the user will usually experience an unending series of warning messages indicating the loss of a connection to the mail server. The user is forced to terminate the e-mail client and either to restart after reconnecting to the mail server or to restart in offline mode.

This problem is not limited to the example of a portable computer with a docking station, but can occur with any computer that loses an operating communications line with a mail server. No effective solution to this problem has been proffered in the prior art. Indeed, most e-mail clients either assume that the remote computer user is always in online mode, or allow the remote computer user to select online or offline modes of operation, but are unable to accommodate a transition between online and offline states of operation.

Therefore, there is a need in the art for an improved method of effecting a transition between online and offline modes of e-mail processing operation where there is a transition between online and offline states. This method should provide the remote computer user an interface for configuring the responsive actions to be taken in the event of a state change. In addition to an improved configuration interface, the system should provide the capability to automatically respond to the detection that the remote computer has made a transition between online and offline states and to continue to process e-mail in accordance with a user's configuration settings.

SUMMARY OF THE INVENTION

The present invention satisfies the above-described needs by providing an improved method for continuously processing electronic messages during and after a transition between online and offline states. The present invention responds to such a transition by automatically switching between online and offline modes of operation. The present invention can be configured to connect to a mail server via a LAN connection when operating in an online mode and via a modem when operating in an offline mode. A user may also configure various aspects of the invention to respond to a transition in a way that accommodates the user's hardware and/or software requirements.

In one aspect, the present invention provides a method for effecting a switch between online and offline modes of electronic message processing. The method includes processing messages in an online mode, while the computer is in an online state. A determination is made that the computer has switched from online state to offline state. In response to the determination, the method switches operation from online mode to offline mode.

More particularly described, the determination of the transition between online mode and offline mode is a signal that the computer has become undocked or disconnected from a mail server. Various aspects of online mode and offline mode are definable by user input, stored in a configuration file.

In another aspect, the present invention provides a method for effecting a switch between online and offline modes of electronic message processing. The method includes determining the state in which the computer is operating. In response to the computer being in a first state, a first mode of operation is enabled. Where the computer is in a second state, a second mode of operation is enabled. The present invention can automatically switch between operating in an online mode, where communication is effected via a LAN connection, and operating in an offline mode, where subsequent communication is effected via a modem connection. The method is also able to receive an indication of a change in states and automatically switch modes of operation to accommodate the change.

In yet another aspect, the present invention provides a method for processing electronic messages in a system including a server, a portable computer, and a docking station. The method includes receiving a signal indicating that the portable computer has been docked in the docking station. Where the portable computer is docked, the method includes determining whether an operable connection exists between the portable computer and a mail server, via the docking station. If the connection is operable, the method includes processing electronic messages in accordance with an online mode of operation. If the connection is not operable, the method includes processing electronic messages in accordance with an offline mode of operation.

The various aspects of the present invention may be more clearly understood and appreciated from a review of the following detailed description of the disclosed embodiments and by reference to the appended drawings.

DETAILED DESCRIPTION

Figure 1:
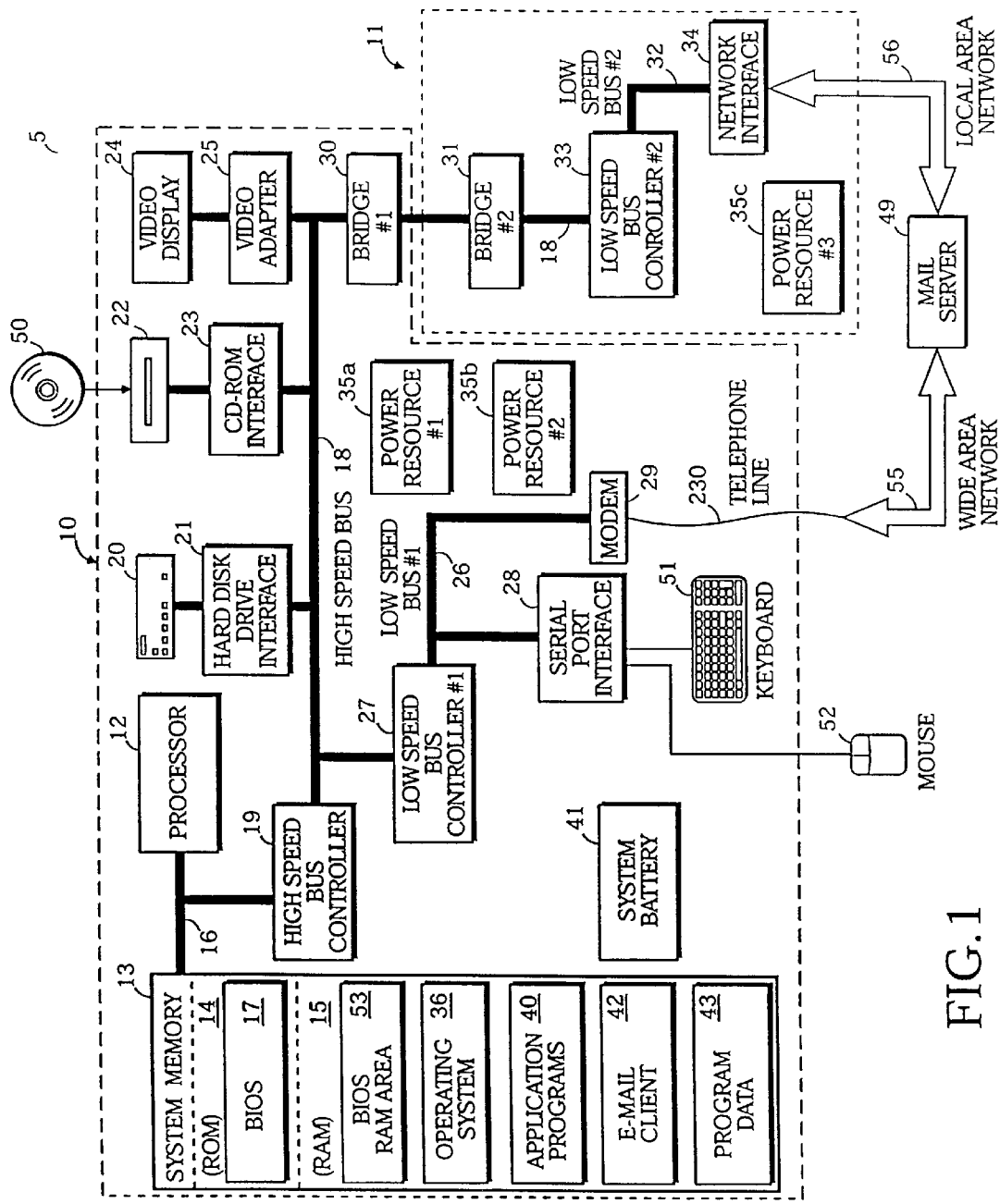
FIG. 1 is a block diagram of a personal computer that provides the operating environment for an embodiment of the present invention.

The present invention is directed to a method for continuously processing electronic mail (e-mail) messages throughout a computer's transition between online and offline states of operation. In an exemplary embodiment, an e-mail application program determines the state of a connection between a portable computer and an electronic mail server and processes electronic messages in accordance with the appropriate state. The portable computer's transition between an online state and an offline state triggers a user-configurable response, designed to permit the continuation of electronic mail message processing in a manner that accommodates the state change. The e-mail application program responds to such a transition by automatically switching between online and offline modes of operation. In one embodiment, a user may configure various aspects of the invention to respond to a transition in a way that accommodates the user's hardware and/or software requirements. For example, the user can configure the invention to communicate with a mail server via a LAN connection when operating in an online mode and to communicate with the server via a modem connection when operating in an offline mode.

Referring now to the drawings, in which like numerals represent like elements throughout the several figures, aspects of the present invention and an exemplary operating environment will be described.

AN EXEMPLARY OPERATING ENVIRONMENT

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates a computer system 5, comprising a portable computer 10 and a docking station 11, designed under the hierarchical device paradigm and is suitable for supporting the operation of an embodiment of the present invention. As shown in FIG. 1, the portable computer 10 includes a processor 12, and a system memory 13 (including read only memory (ROM) 14 and random access memory (RAM) 15), which is connected to the processor 12 by a processor data/address bus 16. A Basic Input/Output System (BIOS) 17 for the portable computer 10 is stored in ROM 14 and is loaded into a BIOS area 53 of RAM 15 upon booting. Those skilled in the art will recognize that the BIOS 17 is a set of basic executable routines that have conventionally helped to transfer information between elements within the portable computer 10.

Within the portable computer 10, a high speed bus 18 is connected to a high speed bus controller 19 and the processor data/address bus 16. In one embodiment, the high speed bus 18 is implemented as a standard Peripheral Component Interconnect (PCI) bus although other standardized bus architectures may be used, such as the Extended Industry Standard Architecture (EISA) bus. The high speed bus controller 19 examines all signals from the processor 12 to route the signals to the appropriate bus. Signals between the processor 12 and the system memory 13 are merely passed through the high speed bus controller 19. However, signals from the processor 12 intended for devices other than system memory 13 are routed onto the high speed bus 18, another level in the hierarchical design of the computer system 5.

Various devices are connected to the high speed bus 18. A hard disk drive 20 is connected to the high speed bus 18 via a hard disk drive interface 21. A CD-ROM drive 22, which is used to read a CD-ROM disk 50, is connected to the high speed bus 18 via a CD-ROM interface 23. The video display 24 or other kind of display device is connected to the high speed bus 18 via a video adapter 25.

A first low speed bus 26 is connected to the high speed bus 18 by a first low speed bus controller 27. The first low speed bus 26 is generally of lesser or equal speed when compared to that of the high speed bus 18. In the one embodiment, the first low speed bus 26 is implemented as an Industry Standard Architecture (ISA) bus although other standardized bus architectures may be used.

A number of program modules may be stored in the drives and RAM 15, including an operating system 36, one or more application programs 40, other program modules including an e-mail client 42, and program data 43. A user enters commands and information into the portable computer 10 by using a keyboard 51 and/or pointing device, such as a mouse 52, which are connected to the first low speed bus 26 via a serial port interface 28. Other input devices (not shown) may include a microphone, joystick, game pad, satellite dish, scanner, and other devices suitable for positioning a cursor on the video display 24.

As shown in FIG. 1, the portable computer 10 also includes a modem 29. Typically, the modem 29 is connected to a telephone line 230. The modem 29 is preferably internal to the portable computer 10 and is connected directly to the first low speed bus 26. Although illustrated in FIG. 1 as internal to the portable computer 10, those of ordinary skill in the art will quickly recognize that the modem 29 may also be external to the portable computer 10. The modem 29 is typically used to communicate by telephone over wide area networks 55, such as the global Internet. Such a network can provide a connection between the portable computer 10 and a mail server 49. The mail server 49 typically includes many or all of the elements described relative to the portable computer 10, by means of a memory storage device within the mail server (not shown). More particularly, the mail server 49 can include application program modules (not shown) and e-mail clients (not shown) that enable the mail server 49 to communicate electronic messages with one or more portable computers 10 via logical connections, such as the modem connection described.

As shown in FIG. 1, a first bridge 30 is connected to the high speed bus 18. The first bridge 30 connects to a second bridge 31, which is part of the docking station 11, when the user "docks" the portable computer 10 into the docking station 11. In this manner, devices in the docking station 11 become part of the portable computer 10 and capable of being controlled by the processor 12. Docking stations 11 are well known to those skilled in the computer arts and typically provide a base station for a portable computer 10. A docking station 11 often includes such devices as a power supply, expansion slots, a monitor, a keyboard connector, connectors for CD-ROM, floppy or hard drives, and a LAN or dial-up connection.

Within the docking station 11, a second low speed bus 32 is connected to the high speed bus 18 by a second low speed bus controller 33. Similar to the first low speed bus 26, the second low speed bus 32 is generally of less or equal speed when compared to that of the high speed bus 18. In one embodiment the second low speed bus 32 is preferably implemented as an ISA bus although other standardized bus architectures may be used. A network interface 34 is connected to the second low speed bus 32 in the docking station 11. The network interface 34 is used for connecting to other computers via a local area network 56, such as the mail server 49. Those skilled in the art will appreciate that other buses (not shown) may be present in the docking station 11 and that the network interface 34 may be capable of communicating with the processor 12 over a higher speed bus (such as a PCI bus) rather than the second low speed bus 32. However, the illustrated buses (the high speed bus 18 and the second low speed bus 32) are used exemplary embodiments to support the present invention.

Those skilled in the art will understand that software modules and data are provided to the portable computer 10 via one of the memory storage devices or computer-readable media, which may include the hard disk drive 20, floppy disk (not shown), CD-ROM 50, RAM 15, ROM 14, and digital tapes (not shown). In an exemplary embodiment, these software modules include an operating system 36, application programs 40, and an e-mail client 42. It will be appreciate that the e-mail client 42 may be implemented as a stand-alone software module or as a component of a DTIM, such as the "MICROSOFT OUTLOOK '98" program. In an exemplary embodiment, the hard disk drive 20 may be used to store these software modules once they are installed from a CD-ROM 26. Software modules may also include files or data structures created during run-time operations of the computer system 5, such as the program data 43.

Although the above description is directed to a portable computer with a docking station 11, those skilled in the art will appreciate that the present invention is not limited to this implementation. Indeed, the present invention may be implemented to operate in cooperation with any computer that is capable of being connected to and disconnected from a server via a communications link. A computer can be placed in an offline state by various means including: undocking the computer (an "undock event"), physically disconnecting a LAN or dial-up connection, failure of the server, and a user's command to cease communication. Similarly, a computer can be placed in an online state by various means including: docking the computer (a "dock event"), a once-failed server becoming available to the computer, and a user's command to initiate communication. Because the present invention relates to a computer that is "remote" from a server, the terms "computer," "remote computer," "personal computer," and "portable computer" are used interchangeably.

BASIC ELECTRONIC MAIL OPERATION

The operating system 36 provides the basic interface between the computer's resources, the user, and the program modules, such as the "MICROSOFT OUTLOOK '98" program. The operating system 36 provides a variety of functions or services that allow an application program 40 to easily deal with various types of input/output (I/O) by issuing relatively simple function calls. Generally described, an application program 40 communicates with the operating system 36 by calling predefined functions provided by the operating system 36. The operating system 36 responds by providing the requested information in a message or by executing the required task.

Figure 2:
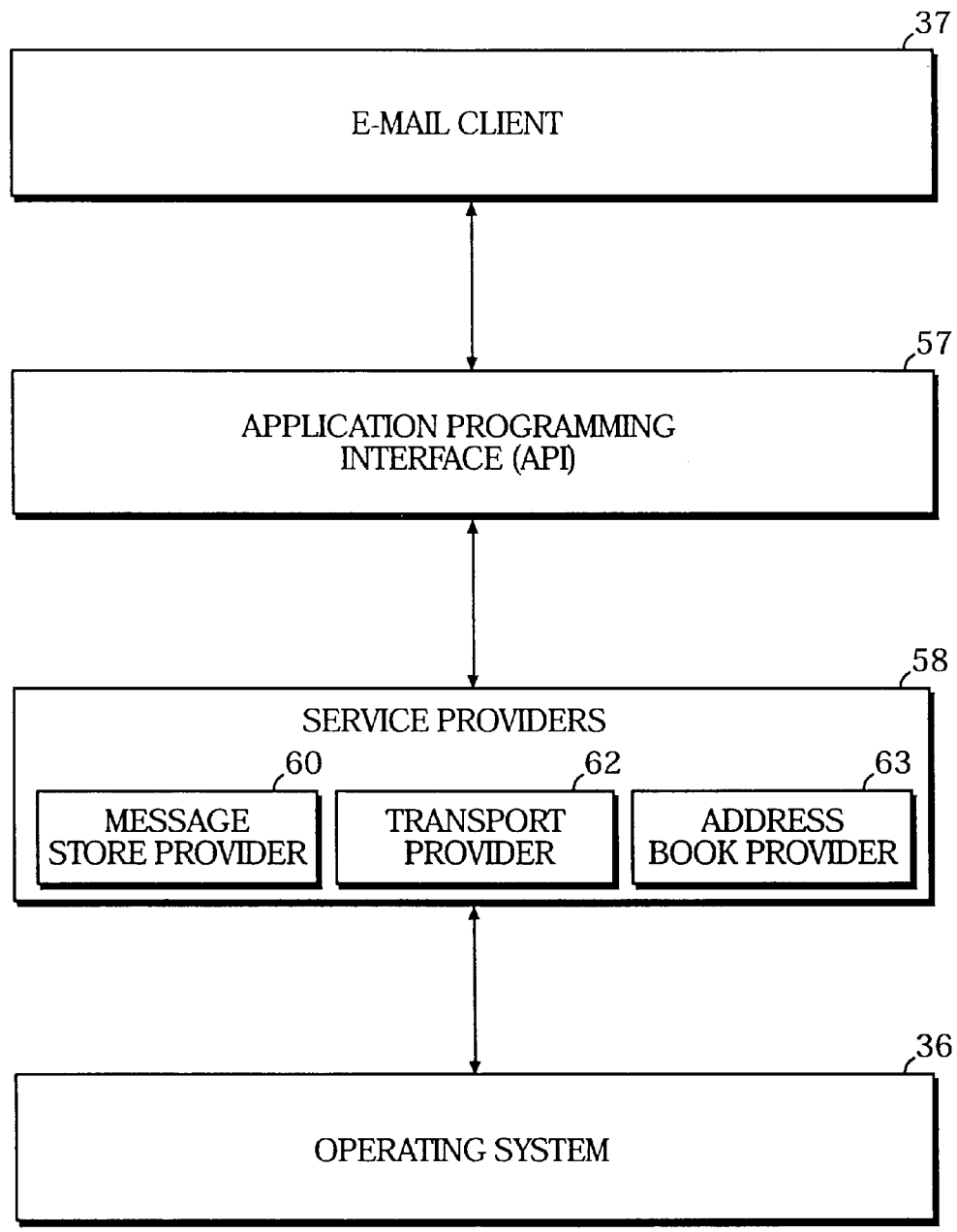
FIG. 2 is a diagram illustrating the modular programming architecture that supports electronic mail messaging in an embodiment of the present invention.

In the context of the present invention, the primary interaction between the e-mail client 42 and the operating system 36 involves e-mail messaging related tasks. FIG. 2 depicts a block diagram of an exemplary structure of an e-mail messaging system that enables the e-mail client 42 (FIG. 1) to interact with the operating system 36. An exemplary operating system 36 incorporates an application programming interface (API) 57 that permits electronic messaging applications, such as the "MICROSOFT OUTLOOK '98" program, to interact with message service providers 58. Examples of APIs are the Messaging Application Programming Interface (MAPI) and the Outlook Messaging Interface (OMI), both of which are well known to those skilled in the computer arts.

The API 57 permits an e-mail client 42 (FIG. 1) to request and execute lower-level services that are performed by the portable computer's 10 (FIG. 1) operating system 36. Interfacing the e-mail client 42 (FIG. 1) and the operating system 36 (FIG. 1), by way of the API 57, permits electronic messages to be communicated between the e-mail client 42 (FIG. 1) and the communications resources that are controlled by the operating system 36. The operating system 36 may, in turn, transmit e-mail messages by way of the computer's modem 29 (FIG. 1) or network interface 34 (FIG. 1) to a mail server 49 (FIG. 1) via a wide area network 55 (FIG. 1) or a LAN 56 (FIG. 1).

Generally, the e-mail client 42 will require the use of the operating system to perform three functions: sending outgoing e-mail messages; receiving incoming e-mail messages; and resolving names. Therefore, an exemplary operating system will incorporate a level of messaging service providers 58 between the API 57 and the operating system 36 itself. Messaging service providers are drivers that ultimately connect the e-mail client 42 to the operating system 36. Most messaging systems include three types of service providers: message store providers 60, address book providers 63, and message transport providers 62.

The messaging service providers 58 cooperate with the API 57 to create and send e-mail messages in the following way. An e-mail message may be composed and addressed to one or more recipients. When the e-mail client 42 sends the e-mail message, the message store provider 60 checks that each recipient has a unique and valid address and that the message has all of the information necessary for transmission to the named recipients. The transport provider 62 executes message transmission and reception between the API 57 and the operating system 36. The e-mail message is then placed in a message buffer (not shown) for subsequent transmission.

If there is a question about a recipient, such as can occur when there are multiple recipients with the same name, the address book provider 63 resolves the ambiguity. Resolving names is usually effected by comparing the names against a list (i.e., address book) that coordinates names to e-mail addresses. This may be done in one of two ways: against address books on the portable computer 10 (FIG. 1) or against address books on the mail server 49 (FIG. 1). The mail server 49 (FIG. 1) generally has a greater capacity for such address books and is, therefore, generally the preferred source of comparison. However, when the mail server is not accessible to the portable computer 10 (FIG. 1), resolving the names of recipients will usually be performed only against the lists on the portable computer 10 (FIG. 1).

Consequently, the API/service providers arrangement provides a structure by which an e-mail client 42, such as that included in the "MICROSOFT OUTLOOK '98" program, can request and execute lower-level services, such as sending messages, receiving messages, and resolving names. The operating system 36 ultimately performs these services at the command of the service providers 58. The operating system utilizes the serial port interface 46 (FIG. 1) or the network interface 34 (FIG. 1) to send, receive and resolve names where those services require accessing a mail server 49 (FIG. 1). Therefore, the status (i.e., availability or unavailability) of an operating communications line at either the serial port interface 46 (FIG. 1) or the network interface 34 (FIG. 1) is critical to the ability of the e-mail client 42 to perform various e-mail messaging functions.

The exemplary operating system 36 has the ability to generate a message to alert all application programs 40 (FIG. 1), including any e-mail client 42, that the status of the portable computer's 10 (FIG. 1) LAN or dial-up communication line has changed. The operating system determines the status of the serial port interface 46 (FIG. 1) and of the network interface 34 (FIG. 1), via the system bus 23 (FIG. 1). Specifically, the operating system is able to indicate that an operating connection to a mail server 49 (FIG. 1), for example, has been rendered inoperative or that an initially inoperative connection to a mail server 49 (FIG. 1) has been rendered operative.

The exemplary operating system notifies applications of a dock or undock event via a Configuration Change Message (CCM). In an exemplary embodiment, the operating system sends a Device Change CCM via the system bus 23 (FIG. 1), to all currently operating applications. The Device Change CCM includes an Event Parameter, which can be set to indicate whether a device is being added or removed.

In the case of a dock event, the Event Parameter of the Device Change CCM is set to indicate the addition of a device. The Device Change CCM can also indicate that the device is a network device, meaning that the device can provide the capabilities to communicate via a network connection, such as a LAN connection. Thus, the exemplary operating system ultimately notifies the e-mail client 42 (FIG. 1) and other applications that a network connection is operative.

In the case of an undock event, the Event Parameter of the Device Change CCM is set to indicate the removal of a device. As with the dock event, the Device Change CCM indicates that the device is a network device, meaning that the device can provide the capabilities to communicate via a network connection. Thus, the exemplary operating system notifies the e-mail client 42 (FIG. 1) and other applications that a network connection is no longer operative.

In this context, "online state" is used to indicate the existence of an operable line of communication between a mail server 49 (FIG. 1) and a portable computer 10 (FIG. 1), regardless of whether an e-mail client 42 is actually using the line to communicate with the server. "Online mode" is used to indicate that an e-mail client 42 running on the portable computer 10 (FIG. 1) is operating in a manner that requires an operable line of communication between the mail server 49 (FIG. 1) and the portable computer 10 (FIG. 1). That is, for an e-mail client 42 to successfully operate in online mode, the portable computer 10 (FIG. 1) on which the e-mail client 42 is running must be in an online state.

Similarly, "offline state" indicates the absence of an operable line of communication between the mail server 49 (FIG. 1) and the portable computer 10 (FIG. 1). "Offline mode" indicates that an e-mail client 42 running on the portable computer 10 (FIG. 1) is operating in a manner that does not require an online state. An offline mode of operation does not require that the portable computer 10 (FIG. 1) is in an offline state. Unlike online mode, offline mode can be successfully implemented by an e-mail client 42 without regard to the online/offline state of the portable computer 10 (FIG. 1).

As discussed above, online mode generally requires an operable connection between the portable computer 10 (FIG. 1) the mail server 49 (FIG. 1) (i.e., an online state). Because this operable connection exists, the e-mail client 42 may perform a variety of e-mail messaging functions. Outgoing messages may be sent to a recipient immediately upon submission, without being queued. The mail server 49 may be polled periodically for new, incoming e-mail messages. Names of recipients may be resolved against address books on the mail server, as necessary. Where the user has chosen to queue outgoing messages, the e-mail client 42 may prompt the user to send the messages before exiting from the e-mail client 42. Additionally, the e-mail client 42 may gather information from incoming messages that the user chooses to retain on the mail server 49 (FIG. 1). This list of e-mail messaging functions is not exhaustive, but merely illustrative of functions that are generally associated with an e-mail client 42 operating in online mode. When operating in online mode, the user will normally be communicating with the mail server 49 via a LAN connection.

Offline mode does not require an operable connection between the portable computer 10 (FIG. 1) and the mail server. Accordingly, the e-mail messaging functions available to the user of an e-mail client 42 operating in offline mode are somewhat limited. Messages are not sent immediately, but are queued until the next time that the e-mail client 42 is operating in online mode, and the portable computer 10 (FIG. 1) is in an online state. The mail server 49 (FIG. 1) is not polled for new, incoming messages; otherwise, each polling attempt would generate a warning message that the server could not be found. Names are not resolved against address books on the mail server 49 (FIG. 1), but only those address books on the portable computer 10 (FIG. 1). This list of functions is not exhaustive, but merely illustrative of functions that are generally associated with an e-mail client 42 operating in offline mode. When operating in offline mode, the user will normally be communicating with the mail server 49 via a modem connection (when communication is required).

When the portable computer 10 (FIG. 1) is connected to a mail server 49 (FIG. 1) via a dial-up connection, the user can configure the e-mail client 42 to operate so as to avoid e-mail messaging functions that hinder efficiency because of the lowspeed modem connection. For instance, the user may operate the e-mail client 42 in offline mode until the user issues a command that requires an operable connection between the portable computer 10 (FIG. 1) and the mail server 49 (FIG. 1), such as a send command. The user also may configure the e-mail client 42 to return to offline mode as soon as the function requiring the mail server 49 (FIG. 1) connection is completed. Additionally, the user can prohibit the reception of an e-mail message that is larger than a particular size and would require a longer connection time to download from the mail server 49 (FIG. 1). Where the dial-up connection is active, the user may operate in online mode. However, by implementing the configuration capabilities of the present invention, the user can optimize e-mail messaging operations by selecting which operations to perform and which to suppress.

While the above description has been directed to the processing of e-mail messages, it is to be appreciated that the invention can be used for any form of electronic messages. Indeed, the "MICROSOFT OUTLOOK '98" program module, which is an exemplary embodiment of the present invention, is capable of processing electronic messages that contain data other than data composed as a mail message. Examples of these electronic messages include scheduling updates, reminders, and alerts that are transmitted as electronic data.

AN EMBODIMENT FOR AUTOMATICALLY RESPONDING TO STATE TRANSITIONS

An exemplary embodiment of the present invention is represented by a desktop information management (DTIM) program module called "MICROSOFT OUTLOOK '98" developed by Microsoft Corporation of Redmond, Washington designed to work with Microsoft Corporation's "WINDOWS 95" and "WINDOWS NT 4.0" operating systems. Briefly described, the "MICROSOFT OUTLOOK '98" program module is a DTIM program module that allows users to manage their own calendar, tasks or "to-do" lists, notes, contacts, and electronic mail messages via different program modules internal to the DTIM program module.

Each program module maintains information or data about things such as appointments, task lists, mail messages, etc., in specific data items in memory. This data can be transmitted as electronic messages to other program modules or other computer users. The DTIM program module has control modules that are used to process these electronic messages between the internal program modules and other users via an electronic messaging system, such as a mail server. The aspect of processing electronic messages, including electronic mail messages, is the focus of the present invention.

Figure 3:
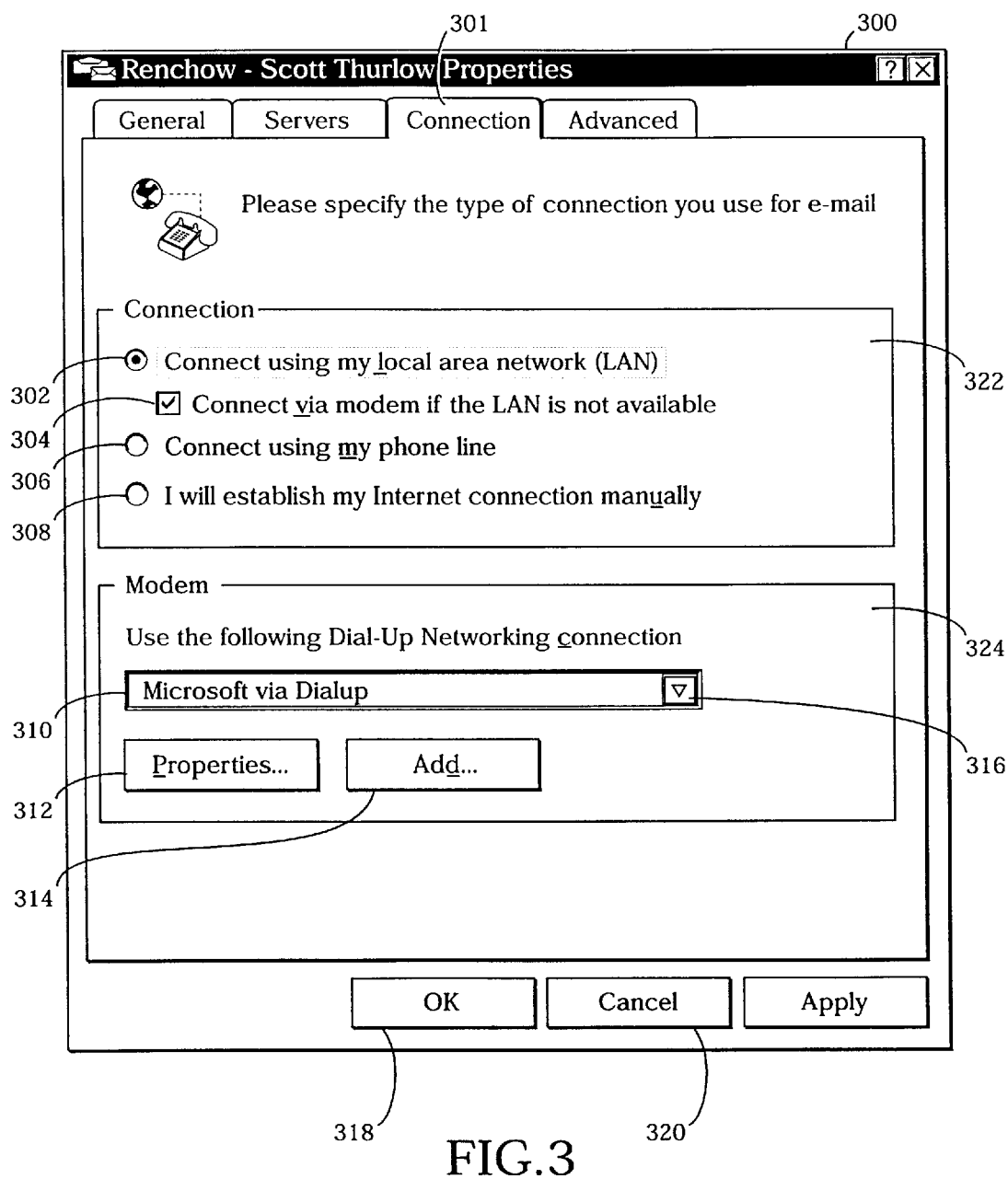
FIG. 3 illustrates the information and selections available in an exemplary connection configuration window.
Figure 4:
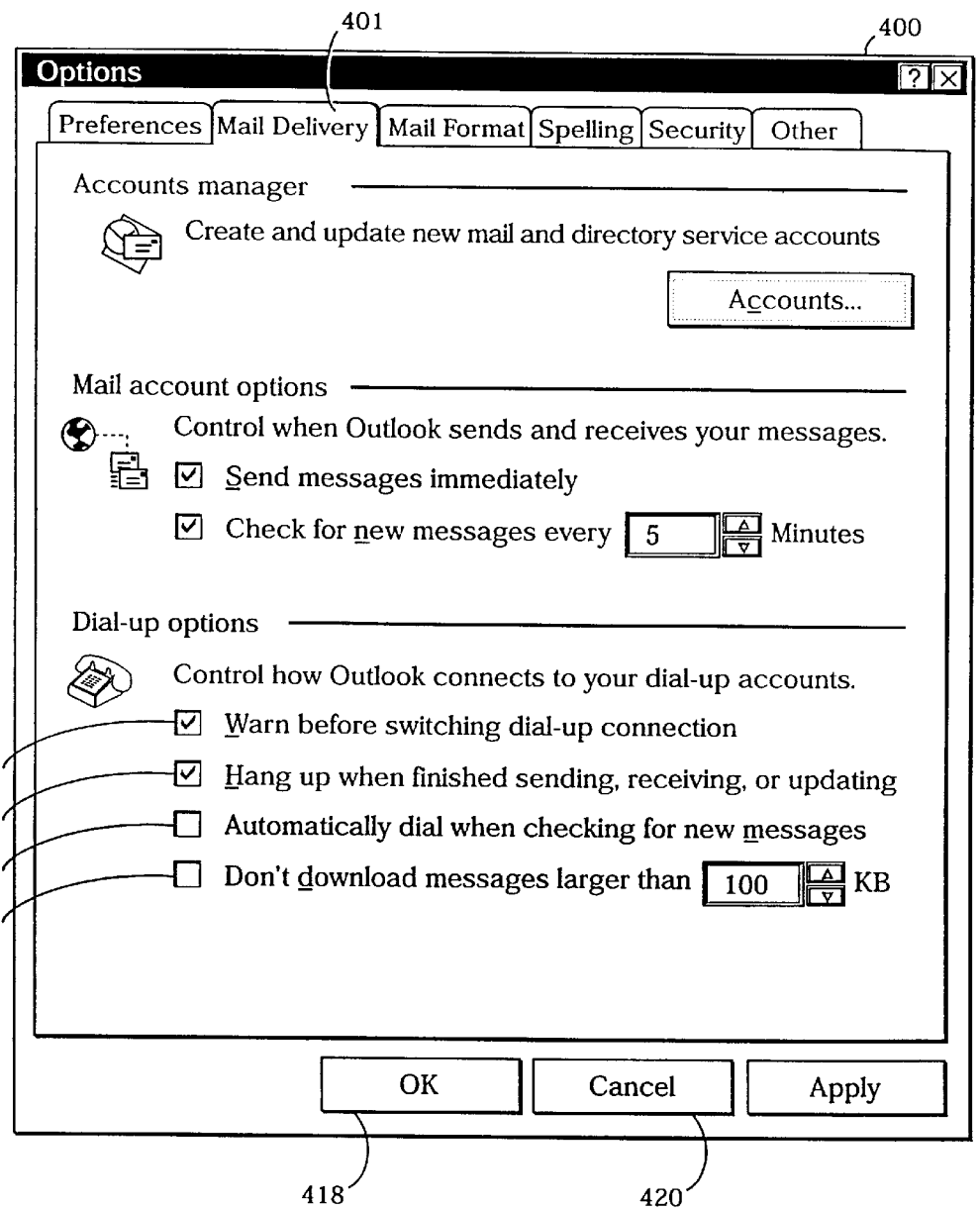
FIG. 4 illustrates the information and selections available in an exemplary dial-up connection configuration window.

The "MICROSOFT OUTLOOK '98" program permits the user to configure various attributes of the present invention to accommodate the user's hardware configuration and/or operation preferences. For example, the user can select whether to send e-mail messages immediately or to queue e-mail messages for later transmission. Similarly, the user may select whether the user will primarily connect to a mail server by LAN or dial-up connection. Because the user's configuration preferences are established in advance, the transition between online mode and offline mode can be made to conform to the user's selections. FIGS. 3 and 4 depict exemplary user interface windows that permit the user to select a configuration that conforms e-mail operations to the user's preferences. After a discussion of the user interface windows, an exemplary embodiment will be discussed, in connection with FIGS. 5a and 5b, in which the effects of the user's configuration choices are made apparent in the context of subsequent e-mail operations.

In order for the e-mail client 42 (FIG. 1) to operate in online mode, the user must establish an online state (i.e., an operable connection between the portable computer 10 (FIG. 1) and a mail server 49 (FIG. 1)). The "MICROSOFT OUTLOOK '98" program establishes an online state in accordance with a user configuration file that is generated by use of a user configuration window.

FIG. 3 illustrates an exemplary Connection Configuration Window (CCW) 300, which is provided by the "MICROSOFT OUTLOOK '98" program. The CCW 300 is displayed when the user performs an initial configuration procedure to customize the "MICROSOFT OUTLOOK '98" program to meet the user's e-mail messaging requirements. The e-mail connection portion of the CCW 300 is presented to the user when the user selects the connection tab 301 from a grouping of tabs within the CCW 300.

Referring still to FIG. 3, the CCW 300 includes a connection dialog box 322 that permits the user to select a primary connection to the server and, where appropriate, to select a secondary connection to the server. The CCW 300 also includes a modem dialog box 324 that permits the user to configure an e-mail client 42 (FIG. 1) to accommodate the hardware specifications of various modem types, where a modem is used as a primary or secondary connection to a mail server. After the user has input the configuration selections in the CCW 300, the user may save those selections in a configuration file that can be accessed by an e-mail client 42 (FIG. 1) to conform its operations thereto. The user can save the configuration selections by selecting the "OK" button 318. Alternatively, the user can cancel selections made in the CCW 300 by selecting the "Cancel" button 320.

The connection dialog box 322, in the CCW 300, includes several buttons (304, 306, 308), which permit the user to select one of three connection types that will serve as the user's primary connection to a mail server. Selection of the LAN button 302 indicates that the user intends to access a mail server primarily by LAN connection (e.g., the network interface 34 (FIG. 1)). Selection of the dial-up button 306 indicates that the user intends to access a mail server primarily by dial-up connection to a wide area network 55 (FIG. 1). Finally, selection of the manual button 308 indicates that the user intends to establish a connection to the mail server 49 (FIG. 1) by some other means (e.g., a modem connection established by a separate application program) and wishes for the e-mail client 42 (FIG. 1) to merely utilize the existing connection. Functionally, this connection is equivalent to a LAN connection.

If the user selects the LAN button 302, the "MICROSOFT OUTLOOK '98" program will define the LAN connection as the primary e-mail connection and will look to the computer's network interface 34 (FIG. 1) for a LAN communication link to a mail server, when a command requiring mail server 49 (FIG. 1) access is issued. As described in connection with FIG. 1 and FIG. 2, such commands include commands to send e-mail messages, receive e-mail messages, and resolve names against address books on a mail server 49 (FIG. 1). When the LAN connection is available, the e-mail client 42 (FIG. 1) will utilize the connection to send and receive e-mail messages, and resolve names. However, when the LAN connection is not available, the CCW 300 allows the user to select a dial-up connection (modem connection) as a secondary connection. The user defines the secondary connection by selecting the LAN connection button 302 as well as the secondary dial-up network checkbox 304. The procedure that the e-mail client 42 (FIG. 1) will follow in response to these commands will be described in more detail below, in connection with FIGS. 6a and 6b.

If the user selects the connect manually button 308, the "MICROSOFT OUTLOOK '98" program will not perform any connection steps, but will rely on a preexisting connection. Instead of controlling a modem, the "MICROSOFT OUTLOOK '98" program will perform handshaking functions as if it were communicating via a LAN connection. If a LAN connection is not available and if a modem connection has not been established before starting the program, the handshaking will fail.

If the user selects the dial-up button 306 (labeled "Connect using my phone line), the e-mail client 42 (FIG. 1) will define the dial-up connection as the primary e-mail connection and will look to the computer's serial port interface 46 (FIG. 1) for a dial-up connection to a mail server 49 (FIG. 1), when a command requiring access to the mail server 49 (FIG. 1) is issued. As described in connection with FIG. 1 and FIG. 2, such commands include commands to send e-mail messages, receive e-mail messages, and resolve names against address books on a mail server 49 (FIG. 1). The procedure that the e-mail client 42 (FIG. 1) will follow in response to these commands will be described in more detail below, in connection with FIGS. 6a and 6b.

The CCW 300 also includes a modem dialog box 324. This box is disabled unless the user selects a dial-up connection (modem connection) as either a primary or secondary connection. The modem dialog box 324 simply allows the user to configure the "MICROSOFT OUTLOOK '98" program to accommodate the requirements of the modem 29 (FIG. 1) that will be utilized to establish the dial-up connection. The user can add modem configuration files to the list by selecting the add button 314 and configure modem configuration files on the list by selecting the properties button 312. By pressing the expose list button 316, the user can review the entire list of modem configurations available for establishing a dial-up connection.

FIG. 4 illustrates an exemplary Mail Delivery Window (MDW) 400, which is provided by the "MICROSOFT OUTLOOK '98" program. The MDW 400 is displayed when the user performs an initial configuration procedure to customize the "MICROSOFT OUTLOOK '98" program to meet the user's e-mail messaging requirements. The e-mail connection portion of the MDW 400 is presented to the user when the user selects the mail delivery tab 401 from a grouping of tabs within the MDW 400.

Referring still to FIG. 4, the MDW 400 includes a list of four options that permit the user to select various attributes affecting the operation of the program while performing e-mail operations via a dial-up connection. After the user has input the configuration selections in the MDW 400, the user may save those selections in a configuration file that can be accessed by an e-mail client 42 (FIG. 1) to conform its operations thereto. The user can save the configuration selections by selecting the "OK" button 418. Alternatively, the user can cancel selections made in the MDW 400 by selecting the "Cancel" button 420. The four options are elected by selecting check-boxes (402, 403, 404, and 405) corresponding to the option desired.

The first check-box, the warn before switching box 402, will cause the "MICROSOFT OUTLOOK '98" program to generate a warning when selected. The warning will be generated before the program switches between dial-up connections. For example, referring back to FIG. 3, the user can define the parameters of a dial-up connection by selecting the properties button 312 (FIG. 3) in the CCW 300. One parameter is the circumstances in which a particular dial-up connection is used. A user may use a first dial-up connection for a primary e-mail account and a second dial-up connection for secondary e-mail account. If the user decides to check the secondary e-mail account, but the user is connected to a mail server via the first dial-up connection, the program will attempt to disconnect the first connection and establish the second connection. Selecting the warn before switching box 402 will generate a warning and prompt the user to for permission before proceeding to switch between dial-up connections.

The second check-box, the hang-up when finished box 404, will disconnect the dial-up connection when certain e-mail operations have been completed via the dial-up connection. As will be discussed below in connection with FIGS. 5a and 5b, the user will generally want to minimize the time spent connected to a mail server 49 (FIG. 1) via a dial-up connection. Accordingly, the "MICROSOFT OUTLOOK '98" program can be configured to disconnect immediately after completing e-mail operations that require a dial-up connection. Thus, the user does not have to monitor the progress of these operations in order to manually disconnect when the operations are completed. If the user does not select this check-box, the program will maintain the dial-up connection until the user affirmatively terminates the dial-up connection.

The third check-box, the auto-dial enable box 406, will establish a dial-up connection when the dial-up connection is selected as the primary or secondary mail server connection in the CCW 300 (FIG. 3) and a "check messages" command is issued. The check messages command is issued by the "MICROSOFT OUTLOOK '98" program periodically, when the user has configured the program to check for new incoming messages on a periodic basis (e.g., every thirty minutes). When the user is connected to the mail server 49 (FIG. 1) via a LAN connection, this does not present a problem, because mail checking is done in the background (i.e., the user does not see the operation occur) over the existing connection. However, where the mail server is to be connected via a dial-up connection, the user may want to suspend the automatic mail checking operation so that the program doesn't automatically dial out on the user's telephone line. Leaving the check-box unselected will suspend mail checking when the dial-up connection is not operative.

The final check-box, the limit message size box 408, merely assists in minimizing the time that the user is connected to the mail server 49 (FIG. 1) via a dial-up connection. When the user receives a message that is larger than a selectable size, the "MICROSOFT OUTLOOK '98" program will not download the message. This is especially advantageous for dial-up connection users, because a large message can prolong the time the user must be connected to the mail server 49 (FIG. 1) via the dial-up connection. Where the dial-up connection is made over a telephone line that is otherwise busy or that is expensive to maintain, large messages can consume valuable time.

A CONFIGURABLE EMBODIMENT

Figure 5A:
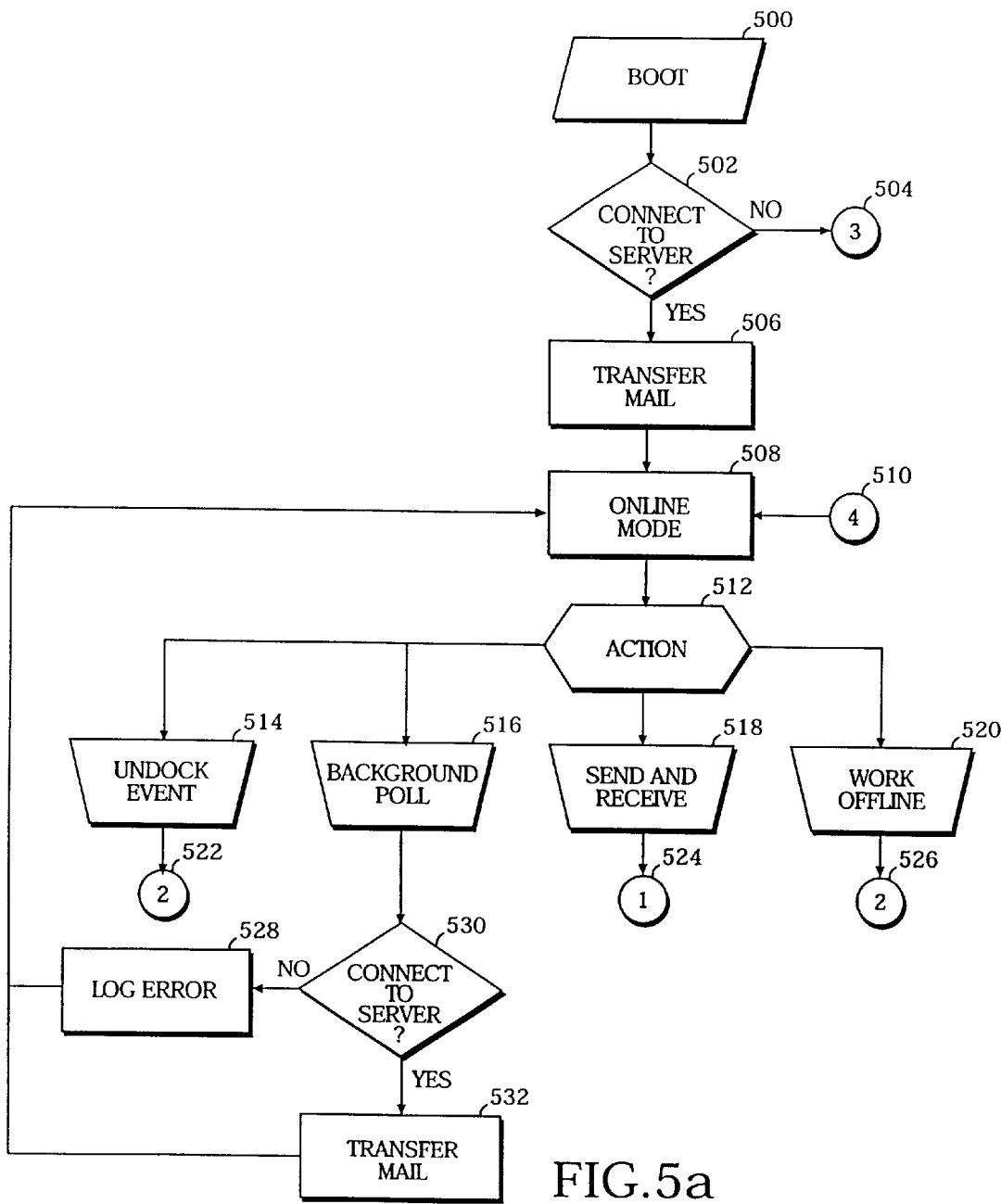
FIGS. 5a and 5b are portions of a flowchart illustrating a method for establishing a connection between a mail server and a remote computer in accordance with a predetermined configuration.
Figure 5B:
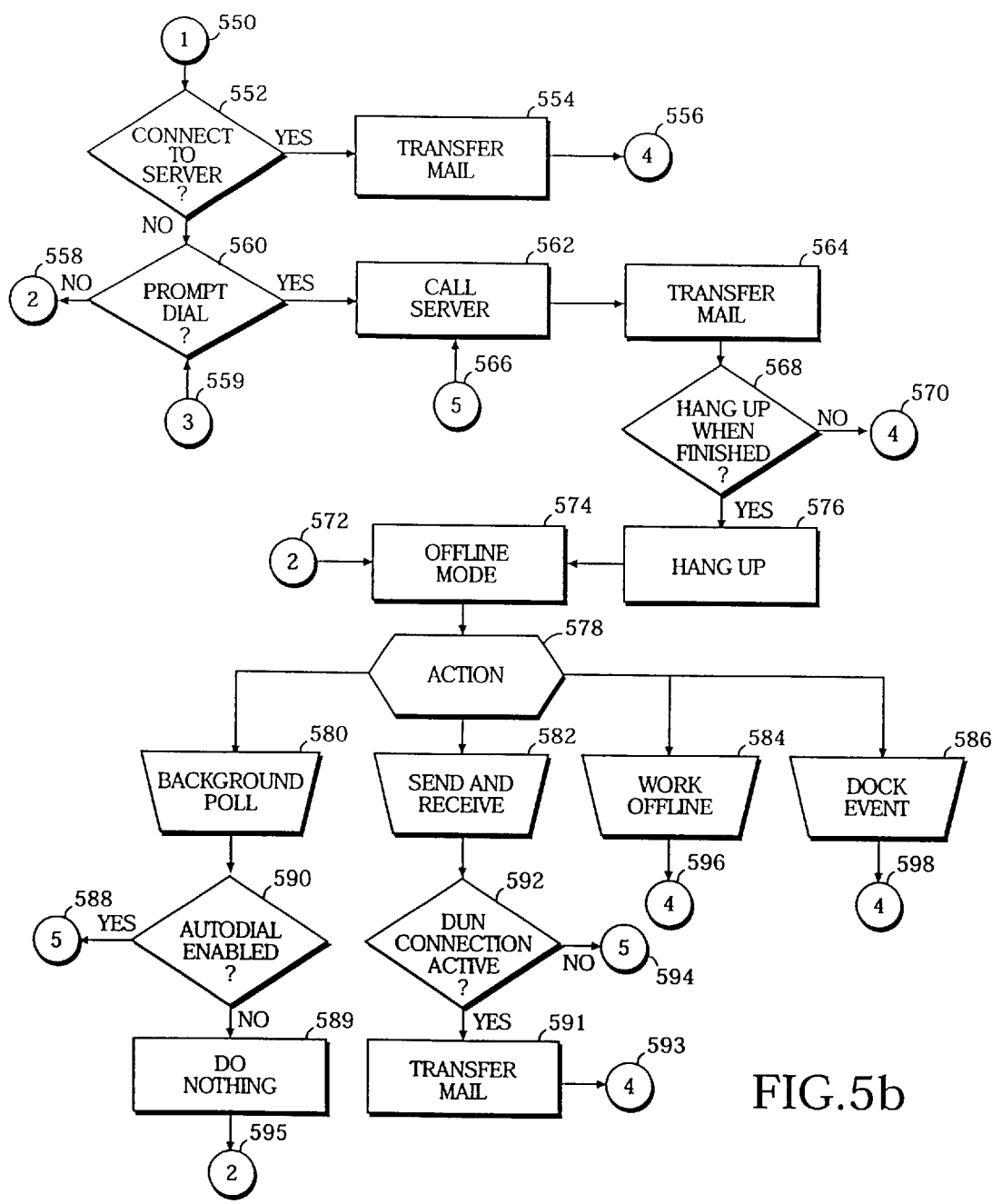

FIGS. 5a and 5b depict a flowchart that is broken into two figures for simplicity. This flowchart illustrates the behavior of the "MICROSOFT OUTLOOK '98" program in response to the configuration parameters set according to the above description and in response to various circumstances common to e-mail processing operation. This flowchart is directed to the situation in which the user has selected a LAN connection as the primary e-mail server 49 (FIG. 1) connection and has selected the dial-up (modem) connection as the secondary connection. However, as a preface to this description, a brief discussion is warranted addressing the behavior of the "MICROSOFT OUTLOOK '98" program in the cases where the user has selected only a LAN connection or only a dial-up connection to communicate with the mail server 49 (FIG. 1). In these cases, the program will not switch between dial-up and LAN connections to the mail server 49 (FIG. 1).

LAN-Only Operation When the user has selected the LAN connection button 302 in the CCW 300 (FIG. 3), but has not selected the secondary dial-up network checkbox 304, the "MICROSOFT OUTLOOK '98" program will operate in LAN-only mode. This mode will never seek to establish a connection to the mail server 49 (FIG. 1), via a dial-up connection. Therefore, if the LAN connection is unavailable or the mail server 49 (FIG. 1) cannot be connected to via the LAN connection for some other reason, the program will simply be unable to enter the online mode of operation.

Accordingly, the "MICROSOFT OUTLOOK '98" program will check the LAN connection upon starting-up (i.e., boot). If the LAN connection to the mail server 49 (FIG. 1) is operational, then the program will send and receive mail via the LAN connection and then enter online mode. Periodically, the program will poll the mail server 49 (FIG. 1) in the background for any new incoming messages. If any new messages are available, or if the user demands to send or receive a message, the LAN connection is checked and the message transfer is completed, if the connection is operational. If the connection is not operational, then an error message is recorded in an error log file and the program simply remains in online mode.

The program will enter offline mode if the user undocks the portable computer 10 (FIG. 1) or if the user toggles a "Work Offline" command from FALSE to TRUE, which indicates the user's desire to disconnect from the mail server 49 (FIG. 1). Once in offline mode, the program will suppress background polling of the mail server 49 (FIG. 1) and will return to online mode only if the user makes an affirmative attempt to immediately send or receive messages, the user toggles the Work Offline command to FALSE, or a dock event occurs. The details of the LAN-only mode of operation will become more apparent in the context of the following discussion of FIGS. 5a and 5b.

Dial-Up-Only Operation

When the user has selected the dial-up button 306 in the CCW 300 (FIG. 3), the "MICROSOFT OUTLOOK '98" program will operate in dial-up-only mode. This mode will never seek to establish a connection to the mail server 49 (FIG. 1), via LAN connection. Therefore, if he dial-up connection is unavailable or the mail server 49 (FIG. 1) cannot be connected to via the dial-up connection for some other reason, the program will simply be unable to enter the online mode of operation.

When the user issues a command to immediately send or receive messages at step 518, the method branches to decision block 552 (via connectors 524 and 550) which checks the LAN connection's operability. If the LAN connection is operative, the method branches to step 554 and e-mail messages are transferred as described above. The method then branches back to online mode at step 508 (via connectors 556 and 510).

The program will enter offline mode if the user undocks the portable computer 10 (FIG. 1) or if the user toggles the Work Offline command to TRUE, which indicates the user's desire to disconnect from the mail server 49 (FIG. 1). Once in offline mode, the program will suppress background polling of the mail server 49 (FIG. 1) unless the user has selected the auto-dial enable box 406 (FIG. 4). The program will return to online mode only if the user makes an affirmative attempt to immediately send or receive messages, the user toggles the Work Offline command to FALSE, or a dock event occurs. The details of the dial-up-only mode of operation will become more apparent in the context of the following discussion of FIGS. 5a and 5b.

LAN with Dial-Up Backup Operation Referring now to FIGS. 5a and 5b, the behavior of the "MICROSOFT OUTLOOK '98" program will be described where the user has selected a LAN connection as the primary connection for e-mail operations and has selected a dial-up connection as a secondary connection. FIGS. 5a and 5b depict a single, bifurcated flowchart which depicts an exemplary method of the present invention. The LAN with dial-up backup configuration is enabled by selecting the LAN connection button 302 and the secondary dial-up network checkbox 304 in the CCW 300. This configuration provides the program the ability to maintain stable e-mail operations even if the user loses the primary LAN connection.

The method starts at step 500, which represents the start-up of the "MICROSOFT OUTLOOK '98" program. The method then branches to decision block 502, at which a determination is made as to whether the LAN connection to the server is operational. If the LAN connection is operational, the method branches to block 506 in which the mail is transferred between the portable computer 10 (FIG. 1) and the mail server 49 (FIG. 1). In this step, any outgoing mail is sent to the mail server 49 (FIG. 1) and any incoming mail that has been stored on the mail server 49 (FIG. 1) is sent to the portable computer 10 (FIG. 1). The method then branches to step 508 in which the program enters online mode. While in online mode, the method is responsive to a periodic background poll and to actions taken by the user.

Step 512 represents the method's responsiveness to any of the actions represented by blocks 514, 516, 518, and 520. Step 514 is an undock event, meaning that the portable computer 10 (FIG. 1) is undocked from its docking station 11 (FIG. 1). In response to the undock event, the method branches to offline mode at step 574 (via connectors 522 and 572). If the user toggles the Work Offline command to TRUE, the method branches to step 520, and on to offline mode at step 574 (via connectors 526 and 572). Where the user has configured the program to periodically check for messages, the method branches to step 516 and performs a background poll of the mail server 49 (FIG. 1) by branching to decision block 530, which checks the LAN connection's operability. If the LAN connection is operable, then the method branches to step 532 and transfers mail as described above. If, on the other hand, the LAN connection is not operable, the method branches to step 528 and records an error message in a log file. The method branches from both steps 528 and 532 back to online mode at step 508. Step 518 represents the user action of issuing a command to immediately send or receive messages.

When the user issues a command to immediately send or receive messages at step 518, the method branches to decision block 522 (via connectors 524 and 550) which checks the LAN connection's operability. If the LAN connection is operative, the method branches to step 554 and e-mail messages are transferred as described above. The method then branches back to online mode at step 508 (via connectors 556 and 510).

If the LAN connection is not operative, the method branches to decision block 560 where a determination is made as to whether the dial-up connection has been selected as a secondary connection. Incidentally, step 560 is also reached (via connectors 504 and 559) if the decision block at step 502 determines that the LAN connection is initially (i.e., at start up) inoperative. If the dial-up connection has not been selected as a secondary connection, the method branches to offline mode at step 574 (via connectors 558 and 572). If, on the other hand, the secondary dial-up connection has been enabled, the method branches to step 562 and calls the mail server 49 (FIG. 1), via the dial-up connection. Once the dial-up connection has been established, the method branches to step 564 and any available e-mail messages are transferred. The method then branches to decision block 568, which determines whether the user has configured the program to terminate the dial-up connection after the available mail has been transferred. If not, the program branches to online mode at step 508 (via connectors 570 and 510). If the user has configured the program to terminate the dial-up connection, then the method branches to step 576 and hangs-up the dial-up connection. The method then branches to offline mode at step 574.

As discussed above, offline mode at step 574 can also be reached from when the user affirmatively elects to operate in offline mode (step 520), when an undock event occurs (step 514), or when the LAN connection is inoperative and a dial-up connection has not been designated as a secondary connection (step 560). As with online mode, in offline mode the method is responsive to any one of four events. This responsiveness is represented by step 578, which provides branches to steps 580, 582, 584, and 586.

If the user toggles the Work Offline command to FALSE (step 584) or a dock event occurs (step 586) the method branches to online mode at step 508 (via connectors 596 and 510 or 598 and 510, respectively). If the user issues a command to immediately send or receive messages (step 582), then the method branches to decision block 592 and determines whether a dial-up connection is active. If the dial-up connection is inactive, the method branches to establish a dial-up connection to the mail server 49 (FIG. 1) at step 562 (via connectors 594 and 566). If, on the other hand, a dial-up connection is active, the method branches to step 591 to transfer the available mail and then branches to step 508 to remain in online mode (via connectors 593 and 510).

The final action to which the method is responsive while in offline mode is the background poll (step 580). Where the program is set up to keep checking for new messages using a background poll, the method will branch to step 580. The method will then branch to decision block 590 to determine whether the user has configured the program to automatically establish a dial-up connection in order to check for new messages. When the program is not so configured, the method will do nothing 589, merely branching back to offline mode at step 574 (via connectors 595 and 572).

The flowchart depicted in FIGS. 5*a* and 5*b* illustrates the behavior of the "MICROSOFT OUTLOOK '98" program, where the program is configured to utilize a dial-up connection in the event of a failure to connect via a LAN connection. However, many of the behaviors apply to the dial-up-only and LAN-only modes of operation discussed above. Notably, all three modes incorporate the online mode and offline modes of operation.

REVIEW OF THE DETAILED DESCRIPTION

From the foregoing description, it will be appreciated that the present invention provides an improved method for continuously processing electronic mail (e-mail) messages during and after a transition between online and offline states. In an exemplary embodiment, the e-mail messaging features of the "MICROSOFT OUTLOOK '98" program provide a user-configurable means for responding to both unexpected and voluntary losses of mail server access. Additionally, the "MICROSOFT OUTLOOK '98" program can respond to newly established connections to a mail server.

During the initial configuration, the user can choose the primary mode of communication between the portable computer and the mail server. Examples of connections are LAN and dial-up connections. The user also can establish a secondary connection which will be utilized in cases where the primary connection is unavailable. The user can also configure the "MICROSOFT OUTLOOK '98" program to perform or suppress certain e-mail messaging functions in order to optimize the performance of the "MICROSOFT OUTLOOK '98" program to accommodate the characteristics of the primary and/or secondary connections selected.

The present invention smoothes the transition from online to offline state by making the transition more transparent to the user and allowing the user to continue e-mail message processing, despite the transition. Where the user issues a command that is inconsistent with the present mode of e-mail messaging operation, the invention can switch modes of operation to accommodate the command. Additionally, the user may configure the invention to prompt the user before proceeding to switch modes of operation.

The present invention has been described in various exemplary embodiments, and particularly as an integrated e-mail messaging feature of the "MICROSOFT OUTLOOK '98" program. However, those skilled in the computer arts will appreciate that the invention is not limited to the described embodiments, but can be implemented in various embodiments including stand-alone e-mail clients. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-readable medium having computer-executable instructions for automatically effecting a switch between online and offline modes of electronic message processing, in response to a computer making a transition between online and offline states, comprising the steps of:

processing electronic messages in accordance with the online mode, the online mode being capable of processing electronic messages in cooperation with a server, when the computer is in the online state, comprising the steps of:
polling the server for a new electronic message,
resolving an electronic message name against an address book on the server,
immediately sending an outgoing electronic message, and
immediately receiving an incoming electronic message;

determining that the computer has made a transition from the online state to the offline state; and in response to the determination that the computer has made a transition from the online state to the offline state, automatically switching to processing electronic messages in accordance with the offline mode, comprising the steps of:
queuing outgoing electronic messages for subsequent sending;
resolving electronic message names against an address book on the computer; and
suppressing polling of the server for new electronic messages.

2. The computer-readable medium of claim 1, wherein the determining step comprises making a determination that the computer has been undocked from a docking station.

3. The computer-readable medium of claim 1, wherein the determining step comprises making a determination that the computer has been disconnected from the server.

4. The computer-readable medium of claim 1, wherein the online mode is defined by a configuration file, at least a portion of the configuration file being determined by receiving a first input set.

5. The computer-readable medium of claim 1, wherein the offline mode is defined by a configuration file, at least a portion of the configuration file being determined by receiving a second input set.

6. The computer-readable medium of claim 1, wherein the step of processing electronic messages in accordance with the offline mode further comprises the steps of:
establishing a secondary connection to the server; and
in response to establishing the secondary connection to the server, processing electronic messages in accordance with the online mode.

7. The computer-readable medium of claim 6, wherein the secondary connection is a dial-up connection.

* * * * *